April 16, 1957  J. A. BJORKSTEN  2,789,199
APPARATUS FOR MAKING FIBER ARTICLES
Filed Nov. 15, 1951
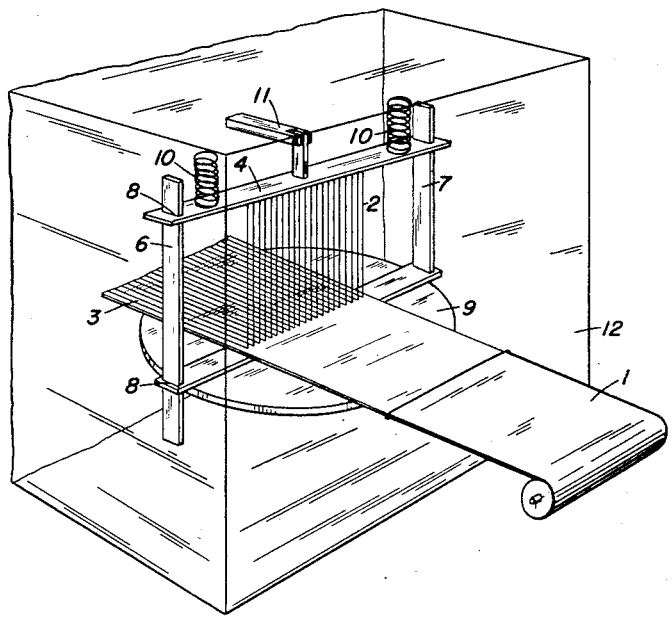
INVENTOR.
JOHAN A. BJORKSTEN
BY
Attorney

United States Patent Office 2,789,199
Patented Apr. 16, 1957

2,789,199
APPARATUS FOR MAKING FIBER ARTICLES

Johan A. Bjorksten, Madison, Wis.

Application November 15, 1951, Serial No. 256,513

2 Claims. (Cl. 219—29)

This invention relates to the manufacture of fine fibers, and more particularly to a method for preparing fiber from films, which may have been cast, calendered, extruded, or otherwise prepared from preferably thermoplastic-type materials.

Heretofore fibers have been made by cumbersome processes, entailing extrusion or drawing operations of the fibers, usually entailing passage of the fiber forming material in highly viscous condition through very small orifices. This inherently involves a very high degree of friction, with consequent possibilities for distortion or breakage of the films and high power requirements.

The present invention contemplates a method for preparing fibers from film. An object of this invention is a new method for preparing fibers. Other objects are fibers having an elliptical or rectangular cross section. Another object is a new type of non-woven fabric, and methods for preparing the same. Further objects will become apparent as the following detailed description proceeds.

Reference is made to the drawings, of which the figure is a diagrammatic perspective view of an application of the invention. In accordance with this invention, a film 1 is moved continuously through a wire grid 2 and is cut thereby into fine strands 3. In the particular application envisaged, the wires are mounted to bars 4 and 5 which are kept in alignment with each other by means of rigid edge bars 6 and 7. The lower bar 5 is rigidly mounted to a wheel 9, by means of which it can be swung in the horizontal plane, so that the intersectional area of the fibers with the film can be varied as desired. In other words, the angle at which the plane, determined by the metal wires, intersects the direction or flow of the film moved therethrough, is determined by the wheel 9. The upper bar 5 is urged upwardly by spring means 10, which maintains tension in the metal wires. Furthermore, the said wire is under the influence of an oscillating means 11, which causes a vibration or oscillation in the wires of between 1,000,000 to 5 oscillations per second, the preferable range being between 125,000 and 25 oscillations per second, thereby affecting and facilitating the cutting action upon the film. This oscillating means may be any of the electrical oscillators or mechanical vibrators which are well known to the art. The cutting wires may be maintained at a temperature of 20 degrees C. above the softening temperature of the thermoplastic material, but the preferred temperature is more than 50 degrees C. above the softening temperature of the film.

As the film is being cut under these conditions in a regular fashion, the wheel 9 is gradually turned so that the angle between the plane of the wire grid and the plane perpendicular to the direction of flow of the film, becomes increasingly acute. The fibers thus become narrower and narrower, and by adjustment the desired thickness of fibers is thus attained.

The cutting wires may further be heated by means of an electrical current from current storing or generating means (not shown). Oxidation of the wires may be prevented by means of an enclosure 12 surrounding these elements which is filled with an inert gas, such as, for example, nitrogen, carbon dioxide, or argon.

In order to operate this invention, it is usually convenient to keep the plane of the wires perpendicular to the plane of motion of the film, so that the fibers cut from the film will initially be as wide as the distance between the wires. In this way it is easy to thread up the machine. The fibers may be wound up and used as such, or they may be blown or suspended on a screen in random arrangement and then sealed together by any of the methods of preparing non-woven fabrics known to the art, either by direct heat seal between rollers or by means of a special sealing or attaching composition, so as to form a non-woven fabric in which the cross section of the fibers is elliptical.

It is thus seen that the device is basically adapted to producing fibers and non-woven fabrics characterized by elliptical or rectangular cross sections of the fibers, in continuous production, without any extrusion step. This is a broad departure which makes possible much higher speeds in production of such fibers, as well as less cost.

The film cut may be nitro cellulose, acetyl cellulose, polystyrene, acrylate film, ethyl cellulose, polyvinyl chloride, polyvinylidene chloride, and copolymers of any of the above, acrylonitrile, briefly, any plastic polymeric film which has sufficient tenacity to permit handling in film and fiber form.

It is thus apparent that the invention is broad in scope and is not to be limited, excepting by the claims, in which it is my intention to cover all novelty inherent in the invention as broadly as possible in view of prior art.

Having thus disclosed my invention, I claim:

1. A device for making continuous filaments, comprising, in combination, means for moving a film of solid, tenacious material in a defined plane and a defined direction; a grid of wires intersecting the said plane; means for imparting to the said wires an oscillation in a direction substantially parallel with their longitudinal direction, the frequency of the said oscillation being between 1,000,000 and 5 oscillations per second; means for maintaining the temperature of said wires above the softening point of said film of solid material, and means for controllably rotating the plane of the said wires so as to change the angle formed between the locus of the points of intersection of the wires of said grid with said film and the direction of motion of the said film.

2. A device for making continuous filaments, comprising in combination, means for moving a film of thermoplastic solid, tenacious material in a defined plane and a defined direction; a grid of wires intersecting this plane; means for heating the said wires to a temperature at least 20 degrees C. in excess of the softening temperature of the thermoplastic material constituting the said film; and means for controllably rotating the plane of the said wires so as to change the angle formed between the locus of the points of intersection of said wires with said film and the direction of motion of the said film and means for oscillating said wires in a direction substantially parallel to their axes at a frequency of 125,000 to 25 per second.

References Cited in the file of this patent

UNITED STATES PATENTS

| | | |
|---|---|---|
| 771,518 | Wilson | Oct. 4, 1904 |
| 1,169,262 | Huff | Jan. 25, 1916 |
| 1,445,992 | Cameron | Feb. 20, 1923 |
| 2,004,580 | Meyer | June 11, 1935 |
| 2,035,138 | Maxfield | Mar. 24, 1936 |
| 2,430,496 | Dodge | Nov. 11, 1947 |
| 2,459,803 | Francis | Jan. 25, 1949 |
| 2,483,405 | Francis | Oct. 4, 1949 |

OTHER REFERENCES

Thomas et al.: "Soldering Aluminum Alloys," Electronics June 1948, pages 90–92.